US005686602A

United States Patent [19]

Farooq et al.

[11] Patent Number: 5,686,602
[45] Date of Patent: Nov. 11, 1997

[54] CROSSLINKED CELLULOSE POLYMER/ COLLOIDAL SOL MATRIX AND ITS USE WITH INK JET RECORDING SHEETS

[75] Inventors: Omar Farooq, Woodbury; David W. Tweeten, Oakdale, both of Minn.; Mohammad Iqbal, Austin, Tex.; Subodh K. Kulkarni, Woodbury, Minn.

[73] Assignee: Minnesota Mining & Manufacturing Company, St. Paul, Minn.

[21] Appl. No.: 548,580

[22] Filed: Oct. 26, 1995

[51] Int. Cl.[6] ............... C08B 15/05; C07H 23/00
[52] U.S. Cl. ........................... 536/101; 536/121
[58] Field of Search .......................... 536/101, 121

[56] References Cited

U.S. PATENT DOCUMENTS

| | | | |
|---|---|---|---|
| 4,371,582 | 2/1983 | Sugiyama et al. | 428/341 |
| 4,381,185 | 4/1983 | Swanson et al. | 8/506 |
| 4,396,433 | 8/1983 | Brandt et al. | 106/194 |
| 4,425,165 | 1/1984 | Bryhn et al. | 106/193 |
| 4,486,335 | 12/1984 | Majewicz | 252/315.3 |
| 4,554,181 | 11/1985 | Cousin et al. | 427/261 |
| 4,871,790 | 10/1989 | Lamanna et al. | 523/333 |
| 5,077,314 | 12/1991 | Philips et al. | 514/640 |

FOREIGN PATENT DOCUMENTS 56-109783  8/1981  Japan.

OTHER PUBLICATIONS

P.A. McManus et al., "*Paper Requirements for Color Imaging with Ink Jets*", TAPPI, vol. 66, No. 7, Jul. 1983, pp. 81–85.

*Primary Examiner*—Nathan M. Nutter
*Attorney, Agent, or Firm*—Gary L. Griswold; Walter N. Kirn, Jr.; Paul W. Busse

[57] ABSTRACT

A cellulose polymer network crosslinked with metal ions selected from the group consisting of: $Al^{+3}$, $Zr^{+4}$, and $Ti^{+4}$, the crosslinked cellulose polymer network having incorporated therein a colloidal sol containing metal oxide-hydroxide particles wherein the metal is Al, Zr, or Ti. The inventive material is optically clear and can be used to cast microporous films, either supported or unsupported, which are useful as coatings on ink jet recording materials.

6 Claims, No Drawings

CROSSLINKED CELLULOSE POLYMER/ COLLOIDAL SOL MATRIX AND ITS USE WITH INK JET RECORDING SHEETS

FIELD OF INVENTION

This invention relates to a metal ion-crosslinked cellulose polymer network and in particular, it relates to one impregnated with a colloidal sol containing metal oxide-hydroxide particles. This invention further relates to the use of the above material with ink jet recording sheets.

BACKGROUND

Water-soluble metal ion-crosslinked cellulose polymer gels are known in the art. The gels are formed by crosslinking cellulose polymer with appropriate polyvalent metal cations such as $Fe^{+3}$, $Cr^{+3}$, $Pb^{+2}$, $Ca^{+2}$, $Al^{+3}$, $Z^{+4}$, $Ti^{+4}$, and the like.

U.S. Pat. No. 4,486,335 discloses a water-soluble carboxymethyl hydroxyethyl cellulose polymer which is crosslinked to a gelled state by reacting the polymer with a suitable aluminum ion in the form of an aluminum salt (such as aluminum acetate or aluminum sulfate) in aqueous solution. The gel exhibits no significant thinning at temperatures less than about 200° F.

Metal ion-crosslinked cellulose gels have been disclosed for such diverse uses as the secondary production of petroleum (see U.S. Pat. No. 4,396,433); stabilizing clay soils to deactivate water and thereby assist in preventing water from fluidizing the clay soil (see U.S. Pat. No. 4,425,165); and the controlled release of and the substantial reduction of the leaching of agricultural chemicals from the site of application (see U.S. Pat. No. 5,077,314). None of the foregoing patents disclose the formation of metal ion-crosslinked cellulose polymers containing a colloidal sol.

Polymers and polyvalent metal salts have found applications in recording surfaces for ink jet recording sheets.

Ink jet recording processes have emerged as one of the most important technologies for high speed electronic printing. With their emergence there has arisen a need for specialty papers having particular recording properties.

The basic imaging technique in ink jet recording involves the use of one or more ink jet assemblies connected to a source of ink. Each ink jet includes a small orifice which is electromagnetically energized by magnetorestrictive, piezoelectric, thermal, or similar means to emit uniform droplets of ink as a continuous stream or as individual droplets on demand. The droplets are directed onto the surface of a moving web and controlled to form printed characters.

The quality of the record obtained in an ink jet recording process is highly dependent on jet operation and the properties of the ink and the recording paper. The ink must be capable of forming stable ink droplets under pressure and must readily emerge from the ink jet orifice. Aqueous inks containing a water soluble dye and a humectant to prevent the ink from drying out in the jet assembly have been found to be particularly desirable. However, the absorption of these inks by the recording sheet has been somewhat problematic particularly in the area of multicolor printing where two or more ink drops may overlap on the surface of the recording sheet.

To obtain good image quality, the recording sheet must absorb the ink rapidly and at the same time insolubilize the ink dye on the sheet surface. The former property reduces the tendency for set-off (i.e., transfer of the ink from the paper to sheet handling rollers and the like) whereas the latter property insures that images having high optical density are obtained. Unfortunately, these two properties are in conflict with one another. Papers having high absorbency draw the ink deeply into the paper and as a result, the optical density of the image formed at the paper surface is reduced. They also suffer from feathering, poor edge acuity, and show-through. Papers with low absorbency, such as highly sized papers, provide good optical density by retaining the ink at the paper surface, but have a high tendency to set-off because the ink vehicle is not absorbed rapidly.

The perfect ink jet recording sheet has been described as a blotter with a magic film. The blotter rapidly absorbs the ink vehicle while the magic film insures that the colorant is retained at the surface of the sheet where its light-absorbing and reflecting properties are greatest. If the colorant is carried deeply into the paper web, its absorbing strength is reduced, web fibers conduct the ink laterally, and poor image sharpness and show-through occurs. See P. A. McManus et al., "Paper Requirements for Color Imaging with Ink Jets". *TAPPI*, Vol. 66, No. 7, July 1983, pp. 81–85.

Some of the efforts which have been directed to developing ink jet recording sheets have adjusted the basis weight, apparent density and filler content of the paper to obtain modified absorption properties (see Japan Kokai No. 74340/1977). Other efforts have added certain cationic sizing agents, such as cationized petroleum resins to the paper in the size press to achieve more desirable ink absorption characteristics (see Japan Kokai No. 109783/1981). Still other efforts have provided a dye-absorbing layer containing certain dye mordants on the surface of the recording sheet.

U.S. Pat. No. 4,371,582 describes a recording sheet containing a cationic polymer latex which is designed to be used in ink jet recording with water soluble dyes to improve water fastness. The preferred cationic polymers are water insoluble and copolymers of a monomer containing a tertiary amino group or a quaternary ammonium group and a copolymerizable ethylenically-unsaturated compound. The insoluble polymer is applied to one surface of the recording sheet as a latex and interacts with water-soluble dyes containing a sulfo group for which it has strong mordanting power.

U.S. Pat. No. 4,381,185 discloses a process for printing with water soluble polymeric dyes in which the paper contains cationic groups. The cationic groups can be introduced into the paper through the addition of an organic additive such as a cationic polyamine or an inorganic additive such as calcium chloride, barium acetate, or aluminum nitrate.

U.S. Pat. No. 4,554,181 discloses an ink jet recording sheet having a recording surface which includes a combination of a water-soluble polyvalent metal salt and a cationic polymer. The polymer has cationic groups which are available in the recording surface for insolubilizing an anionic dye.

Again, none of the above-disclosed patents deal with metal ion-crosslinked cellulose polymer networks containing colloidal sols entrapped therein.

Improved coatings for ink jet recording sheets which substantially reduce or eliminate the problems discussed above with conventional coatings are constantly sought after by the industry.

SUMMARY OF THE INVENTION

By the present invention, it has been discovered that when certain metal alkoxides are hydrolyzed with acid in the presence of cellulose polymer, a metal ion-crosslinked cellulose polymer network is formed, the crosslinked polymer network containing a colloidal sol comprising metal oxide-hydroxide particles which are entrapped within the crosslinked polymer network. As is known, cellulose polymers contain pendant hydroxyl groups. In the present invention, a chelated structure is formed by coordinate bonding of the oxygen atoms of the pendant hydroxyl groups of the cellulose polymer to the metal ion crosslinking agent. This helps create a microporous crosslinked polymeric structure which entraps the metal oxide-hydroxide particles of the colloidal sol and which is optically transparent. As will become more apparent later herein, the inventive material makes an excellent transparency film for ink jet recording sheets.

Thus, in one embodiment the present invention provides a cellulose polymer network crosslinked with metal ions selected from the group consisting of: $Al^{+3}$, $Zr^{+4}$, and $Ti^{+4}$, the crosslinked cellulose polymer network having incorporated therein a colloidal sol comprising metal oxide-hydroxide particles wherein the metal is Al, Zr, or Ti. The inventive material is optically clear and can be used to cast microporous films, either supported or unsupported.

The presently preferred cellulose polymer is hydroxypropyl methylcellulose (HPMC). $Al^{+3}$ is presently preferred as the metal ion crosslinking agent.

In another embodiment, the present invention provides a recording sheet useful in ink jet recording comprising a substrate having a recording surface comprising the above-disclosed metal ion-crosslinked cellulose/colloidal sol matrix; glycol; and nonionic surfactant. This single-layer coating is optically clear and enhances the capillary properties of the film when droplets from an ink jet orifice are applied to the recording sheet.

The presently preferred glycol is polyethylene glycol.

In still another embodiment, the present invention provides a dual-layer coating for ink jet receptors. Positioned between (1) the previously described layer containing metal ion-crosslinked cellulose polymer/colloidal sol matrix; glycol; and nonionic surfactant and (2) the substrate is a layer comprising polymeric mordant for dye or pigment and at least one water-absorbent resin. Preferred water-absorbent resins include poly(vinyl alcohol), cellulose, poly(ethylene glycol), and polyvinylpyrrolidone.

In this application:

"colloidal sol" means an aqueous solution or a suspension with a pH of from about 3 to 6 and having a particle size of from 1–300 nm;

"metal oxide-hydroxide" means either a metal oxide, a metal hydroxide, or a mixture thereof;

"chelation" means bonding to a metal with two or more coordinate bonds from a ligand;

"coordinate bonding" means bonding to a metal center involving electron donation;

"microporous" means a material containing sufficient capillaries to have sorbent qualities; and "optically clear" or "optically transparent" mean having greater than 90% transmittance of visible light.

Other aspects, advantages, and benefits of the present invention are apparent from the detailed description, the examples, and the claims.

DETAILED DESCRIPTION OF INVENTION

The inventive metal ion-crosslinked cellulose/colloidal sol matrix is prepared by first hydrolyzing the appropriate metal (i.e., Al, Zr, or Ti) alkoxide with an acid, organic or inorganic, in the presence of the cellulose polymer. Non-limiting examples of such acids include, but are not limited to, $CH_3COOH$; $CF_3COOH$; $CF_3SO_3H$; HCl; $HNO_3$, etc. The particular acid used will control the rate of hydrolysis and consequently, the degree of crosslinking of the cellulose. For example, hydrolysis with $CH_3COOH$ is much slower compared to the use of stronger acids such as HCl, $HNO_3$, etc. The polyvalent metal ions are thus generated in situ and crosslink the cellulose polymer by chelation (coordinate bonding) of the oxygen atoms of hydroxyl-containing groups pendant from the cellulose polymer to the metal ion crosslinking agent. Upon hydrolysis of the metal alkoxide, hydrated polyvalent metal ion which is not functioning as a crosslinking agent forms a colloidal sol of "metal oxide-hydroxide" particles which become entrapped in the metal ion-crosslinked cellulose polymer network.

As disclosed herein earlier, the above-disclosed metal ion-crosslinked cellulose polymer impregnated with a colloidal sol containing metal oxide-hydroxide particles can be used as a single-layer coating on a receptor surface for ink jet recording. The single-layered construction containing the metal ion-crosslinked cellulose polymer/colloidal sol matrix also contains glycol and nonionic surfactant. The thickness of this layer is preferably about 1–5 microns and more preferably, about 1–2 microns.

Any cellulose polymer may be used in the present invention. Non-limiting examples of cellulose polymers include methylcellulose, hydroxypropyl ethylcellulose, hydroxyethyl cellulose, hydroxypropyl methylcellulose (e.g., METHOCEL™ available from Dow Chemical Co., Midland, Mich.), etc.

Non-limiting examples of glycols or resins include poly (ethylene glycol), poly(propylene glycol), poly(propylene glycol-b-ethylene glycol), polytetrahydrofuran, poly (tetrahydrofuran-co-ethylene oxide), and the like.

Non-limiting examples of nonionic surfactants include nonionic hydrocarbon surfactants, and nonionic fluorocarbon surfactants. Common nonionic hydrocarbon surfactants include ethoxylated alkylphenols (e.g., TRITON™ X-100, X-114, and X-405 and their reduced forms available from Rohm and Haas, Philadelphia, Pa.). A preferred nonionic hydrocarbon surfactant is TRITON™ X100. Nonionic fluorocarbon surfactants include linear perfluorinated polyethoxylated alcohols (e.g., ZONYL FSN™, FSN™-100, FSO™, and FSO™-100 surfactants available from DuPont Specialty Chemicals, Wilmington, Del.), fluorinated alkyl polyoxyethylene ethanols (e.g., FLUORAD™ FC-170C available from 3M, St. Paul, Minn.), fluorinated alkyl alkoxylate (e.g., FLUORAD™ FC-171 available from 3M, St. Paul, Minn.), fluorinated alkyl esters (e.g., FLUORAD™ FC-430, FC-431, and FC-740 available from 3M, St. Paul, Minn.). Preferred nonionic fluorocarbon surfactants include ZONYL FSO™, FLUORAD™ FC-170C, and FLUORAD™ FC-171.

When a dual-layered construction is utilized, the crosslinked cellulose polymer/colloidal sol matrix-containing layer is the top layer and underneath is a layer containing polymeric mordant for dyes or pigments and at least one water-absorbent resin (e.g. poly(vinyl alcohol), cellulose, poly(ethylene glycol), polyvinylpyrrolidone, etc.). The thickness of the underlayer containing polymeric mordant for dyes, etc., is preferably about 8–20 microns and more preferably, about 8–12 microns.

Non-limiting examples of polymeric mordants for dyes and pigments include those disclosed in U.S. Pat. Nos.

5,342,688 and 5,354,813, both of which are herein incorporated by reference. Typically these polymeric mordants contain quaternized nitrogen heterocycles as groups pendant to the polymer backbone.

Non-limiting examples of water-absorbing resins include polyvinylpyrrolidone and its copolymers, poly(vinyl alchohol) and its copolymers, poly(2-dimethylaminoethyl methacrylate) and its copolymers, poly(acrylic acid) and its copolymers, poly(ethylene oxide), polyacrylamide, poly (ethylene imine), gelatin, etc.

The substrate of the ink jet receptor can be any conventional substrate known to those skilled in the art. Preferred are optically clear or transparent materials. Non-limiting examples of suitable substrates include poly(ethylene terephthalate) ("PET"), poly(vinylidene chloride) (PVDC) primed PET, corona or flame-treated PET, poly(aryl ether ketone), poly(aryl ether sulphone), etc.

The coatings of this invention may be applied to the substrate by conventional coating methods such as knife coating, roll coating, gravure coating, bar coating, etc.

The following non-limiting examples further illustrate the present invention.

EXAMPLES

The materials employed below were obtained from Aldrich Chemical Co. (Milwaukee, Wis.) unless otherwise specified. Copolymer-958 is a water soluble polymer available from ISP (International Specialty Products), Wayne, N.J. Airvol-523 is a poly(vinyl alcohol) available from Air Products, Allentown, Pa. Gohsenol KP-O6 is a poly(vinyl alcohol) available from Nippon Gohsei, Osaka, Japan. Carbowax-600 is a poly(ethylene glycol) (MW=600 daltons) available from Union Carbide, Danbury, Conn. The mordant used in the following examples is a polyvinylpyridine that has been alkylated with the chloroacetonehydrazone of aminoguanidinium hydrochloride as disclosed in U.S. Pat. No. 5,354,813, Class A, where X is chloride. Methocel F-50 is a cellulose polymer available from Dow Chemical Co., Midland, Mich. XAMA-7 is an aziridine crosslinker available from Hoechst Celanese Corp., Somerville, N.J. Triton X-100 is a nonionic hydrocarbon surfactant available from Rohm and Haas, Philadelphia, Pa. Particle size analysis was performed using a Coulter instrument Model N4. Viscosity was determined at 100 sec$^{-1}$ shear rate using a Bohlin VOR control strain rheometer with double gab cup and bob geometry. Scanning electron microscopy (SEM) was performed using a Hitachi model S-4500 field emission scanning electron microscope. Surface energy was measured using a Cahn Instruments model DCA-322 dynamic contact angle analyzer. Color densities were measured using a MacBeth TR 927 densitometer.

Example 1

This example demonstrates the preparation of an aluminum ion-crosslinked cellulose polymer network impregnated with a colloidal aluminum oxide-hydroxide sol.

A solution of 36 g hydroxypropyl methylcellulose (HPMC), (METHOCEL-F-50, Dow Chemical, MW 22,000 daltons, 50 mPa viscosity for a 2% solution) was prepared in 800 g water according to Dow Chemical's procedure (METHOCEL Cellulose Ethers, Technical Handbook, Dow Chemical). To this solution was added 94 g aluminum triisopropoxide with high-speed mechanical stirring. The mixture was stirred at about 60° C. for 1–2 hrs to obtain a fine slurry. To this mixture was added 11 g of 37% hydrochloric acid with stirring. The sol was prepared using vigorous stirring for 36 hours with intermittent addition of water to a total volume of 1.0–1.2 liter. The desired 6–7% sol concentration was obtained by slow evaporation of water with stirring, resulting in a clear and transparent sol with an average particle size of 161 nm.

A 2% by weight aqueous solution of the above sol had a viscosity of 52.9 MPa at 10° C., 27.7 MPa at 25° C., 13.6 MPa at 40° C., and 7.5 MPa at 55° C. A 6% solution was coated using a #4 wire wound rod onto 4 mil PVDC primed PET and dried at 110° C. for 1 minute to give a 0.4 micon thick clear, transparent coating. Scanning electron microscopy showed that the film had a semi-microstructured surface. This material is useful for applications requiring water and/or solvent absorptive properties, such as for receptor properties for printing media, particularly those requiring transparent materials.

Example 2

The procedure of Example 1 was repeated except that 11 g of 69% nitric acid was used instead of hydrochloric acid. The desired 7% sol concentration was obtained by slow evaporation of water with stirring, resulting in a clear and transparent sol with an average particle size of 181 nm.

A 2% by weight aqueous solution of the above sol had a viscosity of 20.2 MPa at 10° C., 11.2 MPa at 25° C., 6.3 MPa at 40° C., and 0.8 MPa at 55° C. A 6% solution was coated using a #4 wire wound rod onto 4 mil PVDC primed PET and dried at 110° C. for 1 minute to give a 0.4 micon thick clear, transparent coating. Scanning electron miscroscopy showed that the film had a microstructured surface. This material is useful for applications requiring water and/or solvent absorptive properties, such as for receptor properties for printing media, particularly those requiring transparent materials.

Example 3

The procedure of Example 1 was repeated except that 9 g of glacial acetic acid was used instead of hydrochloric acid. The desired 6% sol concentration was obtained by slow evaporation of water with stirring, resulting in a clear and transparent sol. A clear and transparent film was prepared by casting the above solution on PVDC-primed PET.

Example 4

The procedure of Example 1 was repeated except that the amount of hydroxypropyl methylcellulose used was reduced to 18 g. The desired 6% sol concentration was obtained by slow evaporation of water with stirring, resulting in a clear and transparent sol. A clear and transparent film was prepared by casting the above solution on PVDC-primed PET.

Example 5

The procedure of Example 1 was repeated except that the amount of hydroxypropyl methylcellulose used was reduced to 12 g. After 60 hours of digestion, additional hydrochloric acid was added to complete the hydrolysis. The desired 6% sol concentration was obtained by slow evaporation of water with stirring, resulting in a clear and transparent sol. A clear and transparent film was prepared by casting the above solution on PVDC-primed PET.

Example 6

The procedure of Example 1 was repeated except that the amount of hydroxypropyl methylcellulose used was reduced to 9 g. After 60 hours of digestion, additional hydrochloric acid was added to complete the hydrolysis. The desired 6% sol concentration was obtained by slow evaporation of water with stirring, resulting in a clear and transparent sol. A clear and transparent film was prepared by casting the above solution on PVDC-primed PET.

Example 7

The procedure of Example 1 was repeated except that trifluoromethanesulfonic acid was used instead of hydrochloric acid. The desired 6% sol concentration was obtained by slow evaporation of water with stirring, resulting in a clear and transparent sol. A clear and transparent film was prepared by casting the above solution on PVDC-primed PET.

Example 8 (Comparative Example)

The procedure of Example 1 was repeated except that no hydroxypropyl methylcellulose was used. After 7 days of digestion, a white, turbid-appearing sol was obtained with an average particle size of 100 nm.

Equal parts by volume of the above solution and HPMC solution (4% aqueous) were mixed under vortex to give and opaque, white composition. A hazy film was prepared by casting the above solution on PVDC-primed PET.

Example 9

The following coating solution was made by mixing aqueous solutions of the following components:

| COMPONENT | Parts by Weight |
|---|---|
| Copolymer-958 (50% by weight) | 52.0 |
| Airvol-523 (10% by weight) | 31.2 |
| Gohsenol KP-O6 (10% by weight) | 3.5 |
| Carbowax-600 (50% by weight) | 7.8 |
| Mordant (20% by weight) | 3.8 |
| Methocel F-50 (4.0% by weight) | 1.4 |
| XAMA-7 (16% by weight) | 0.33 |

The above aqueous solution was coated at 0.8–1.0 g/ft$^2$ on 4 mil PVDC-primed PET using an automated knife coater and dried at 260° F. to give a bottom layer for a transparency film.

The following coating solution was made by mixing aqueous solutions of the following components:

| COMPONENT | Parts by Weight |
|---|---|
| Example 2 Sol (6.8% by weight) | 80 |
| PEG Blend* (10% by weight) | 12 |
| Triton X-100 (10% by weight) | 2 |
| Urea (10% by weight) | 6 |

*The PEG blend was prepared by mixing poly(ethylene glycols) of varying MW (i.e., 600, 1,000, 4,500, and 22,000) in equal parts by weight.

A small portion of the above aqueous solution was diluted to 2% by weight and found to have a viscosity of 25.2 MPa at 10° C., 15.5 MPa at 25° C., 8.1 MPa at 40° C., and 4.3 MPa at 55° C. The above solution was coated on the bottom layer prepared above using an automated knife coater adjusted to give a 5 mil wet thickness, and running at 7.5 ft./min. web speed. The coating was dried at 250° F. to give a two layer transparency film.

Example 10

This example demonstrates the color densities obtained when the transparency film of Example 9 was imaged at 360 dpi with an Epson Color Stylus Writer. The example also compares the densities obtained with other commercially available films. Color densities were measured in a MacBeth densitometer. Color shift means a visually observable hue shift as compared to ink printed on plain or coated ink jet receptive paper. Coalescence means droplets of ink merged together, leaving a grainy image. Dry time is the time required for ink to dry so that it does not transfer under moderate finger pressure.

| Films | Dry time (min) | Black | Green | Yellow | Comment |
|---|---|---|---|---|---|
| Example 9 | 0 | 1.03 | 0.72 | 0.27 | Transparent |
| Epson S041030 | 0 | 1.07 | 0.83 | 0.34 | Color shift |
| Canon (CT-101) | 0 | 1.08 | 0.83 | 0.35 | Color shift |
| 3M CG-3460 | 0.5 | 0.74 | 0.72 | 0.23 | Coalescence |
| 3M CG-3480 | 0.8 | 0.74 | 0.73 | 0.23 | Coalescence |
| Xerox 3R3351 | 0 | 0.77 | 0.77 | 0.23 | Coalescence |
| Folex BG-33 | 1.5 | 0.73 | 0.71 | 0.28 | Coalescence |

Reasonable variations and modifications are possible from the foregoing disclosure without departing from either the spirit or scope of the present invention as defined in the claims.

What is claimed is:

1. A cellulose polymer network crosslinked with metal oxide-hydroxide particles selected from the group consisting of $Al^{3+}$, $Zr^{4+}$, and $Ti^{4+}$, the crosslinked cellulose polymer having incorporated therein an aqueous solution or a suspension with a pH of from about 3 to 6 and having metal oxide-hydroxide particles of from 1–300 nm wherein said metal is Al, Zr, or Ti.

2. The cellulose polymer network according to claim 1 wherein metal ion is $Al^{+3}$.

3. The cellulose polymer network according to claim 1 wherein said metal ion is $Zr^{+4}$.

4. The cellulose polymer network according to claim 1 wherein said metal ion is $Ti^{+4}$.

5. The cellulose polymer network according to claim 1 wherein said cellulose polymer is hydroxypropyl methylcellulose.

6. The cellulose polymer according to claim 1 wherein said metal oxide-hydroxide particles are alumina-aluminum hydroxide.

* * * * *

UNITED STATES PATENT AND TRADEMARK OFFICE
CERTIFICATE OF CORRECTION

PATENT NO.: 5,686,602

DATED: November 11, 1997

INVENTOR(S): Omar Farooq, David W. Tweeten, Mohammad Iqbal, and Subodh K. Kulkarui It is certified that error appears in the above-identified patent and that said Letters Patent is hereby corrected as shown below:

Section [56] References Cited
under FOREIGN PATENT DOCUMENTS       insert --0 634 286 A1    1/1995    European Pat. Off.--

Col. 5, line 32   "lapan" should read --Japan--

Signed and Sealed this

Thirtieth Day of June, 1998

Attest:

BRUCE LEHMAN

Attesting Officer

Commissioner of Patents and Trademarks